(12) United States Patent
Kim et al.

(10) Patent No.: US 11,457,141 B2
(45) Date of Patent: Sep. 27, 2022

(54) VEHICLE AND CONTROLLING METHOD OF THE VEHICLE

(71) Applicants: HYUNDAI MOTOR COMPANY, Seoul (KR); KIA CORPORATION, Seoul (KR)

(72) Inventors: Hyunsang Kim, Hwaseong-si (KR); Yun Sup Ann, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/337,912

(22) Filed: Jun. 3, 2021

(65) Prior Publication Data
US 2022/0086335 A1 Mar. 17, 2022

(30) Foreign Application Priority Data
Sep. 17, 2020 (KR) .................. 10-2020-0119808

(51) Int. Cl.
| | | |
|---|---|---|
| *H04N 5/232* | (2006.01) | |
| *B60R 11/04* | (2006.01) | |
| *B60W 40/08* | (2012.01) | |
| *G06V 20/56* | (2022.01) | |
| *G06V 20/59* | (2022.01) | |
| *G06V 40/16* | (2022.01) | |

(52) U.S. Cl.
CPC ......... *H04N 5/23219* (2013.01); *B60R 11/04* (2013.01); *B60W 40/08* (2013.01); *G06V 20/56* (2022.01); *G06V 20/59* (2022.01); *G06V 40/16* (2022.01); *B60R 2300/101* (2013.01); *B60R 2300/8073* (2013.01); *B60W 2540/043* (2020.02)

(58) Field of Classification Search
None
See application file for complete search history.

(56) References Cited

U.S. PATENT DOCUMENTS

| | | | | |
|---|---|---|---|---|
| 6,323,761 | B1 * | 11/2001 | Son ...................... | B60R 25/305 |
| | | | | 340/426.35 |
| 9,315,152 | B1 * | 4/2016 | Maestas ................ | B60R 25/305 |
| 2008/0316312 | A1 * | 12/2008 | Castillo ................. | B60R 25/305 |
| | | | | 348/E7.086 |
| 2015/0189241 | A1 * | 7/2015 | Kim ........................ | G06T 7/73 |
| | | | | 348/148 |
| 2016/0082896 | A1 * | 3/2016 | Mouser .................. | H04N 7/183 |
| | | | | 348/148 |
| 2021/0097864 | A1 * | 4/2021 | Zhao ...................... | G08G 1/205 |
| 2021/0331706 | A1 * | 10/2021 | Kim ....................... | G06V 20/59 |

FOREIGN PATENT DOCUMENTS

JP 2005004385 A * 1/2005

\* cited by examiner

*Primary Examiner* — Rebecca A Volentine
(74) *Attorney, Agent, or Firm* — Morgan, Lewis & Bockius LLP

(57) ABSTRACT

Vehicle configured for reducing cost by performing a plurality of functions using a single camera, may include a camera; a at least one sensor configured to obtain location information related to a driver; a moving portion connected to the camera and configured to adjust a photographing direction of the camera; and a controller connected to the at least one sensor and the moving portion and configured to control the moving portion so that the photographing direction of the camera faces the outside of the vehicle or the inside of the vehicle according to the location information related to the driver.

16 Claims, 6 Drawing Sheets

VEHICLE AND CONTROLLING METHOD OF THE VEHICLE

CROSS-REFERENCE TO RELATED APPLICATION

The present application claims priority to Korean Patent Application No. 10-2020-0119808, filed on Sep. 17, 2020 in the Korean Intellectual Property Office, the entire contents of which is incorporated herein for all purposes by this reference.

BACKGROUND OF THE INVENTION

Field of the Invention

The present invention relates to a vehicle and a controlling method of a vehicle, capable of authenticating an outdoor driver and determining a state of an indoor driver using a single camera.

Description of Related Art

In recent years, as various technologies for authenticating a driver have been developed, technologies for accessing a vehicle in a more convenient manner by utilizing the biometric information related to the driver or the facial information related to the driver have been developed.

Furthermore, to reduce the burden on the driver and improve convenience, research on a vehicle provided with an advanced driver assist system (ADAS) that actively provides information on the vehicle state, driver state, and surrounding environment is actively being conducted.

The technology that allows access using the facial information related to the driver or the technology that controls the behavior of the vehicle by determining the condition of the driver all require a camera configured for obtaining a driver's image as an essential requirement, but the cost of the vehicle may increase as the number of cameras increases.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a vehicle control method capable of authenticating a driver outside the vehicle and determining the state of the driver inside the vehicle, using a single camera.

A vehicle according to an exemplary embodiment of the present invention may include a camera; a sensor portion configured to obtain location information related to a driver; a moving portion connected to the camera and configured to adjust a photographing direction of the camera; and a controller connected to the sensor portion and the moving portion and configured to control the moving portion so that the photographing direction of the camera faces the outside of the vehicle or the inside of the vehicle according to the location information related to the driver.

The controller, when the driver is located outside the vehicle, may control the moving portion so that the photographing direction of the camera faces the outside of the vehicle.

The controller, when the door is unlocked and the door is opened even if the driver is located outside the vehicle, may control the moving portion so that the photographing direction of the camera faces the inside of the vehicle.

The controller, when a preset time elapses after the door is opened and the driver is located outside the vehicle, may control the moving portion so that the photographing direction of the camera faces the inside of the vehicle.

The controller, when the driver is located inside the vehicle, may control the moving portion so that the photographing direction of the camera faces the inside of the vehicle.

The controller, when the door is unlocked and the door is opened, may control the moving portion so that the photographing direction of the camera faces the outside of the vehicle.

The controller, when a preset time elapses after the door is opened and the driver is located inside the vehicle, may control the moving portion so that the photographing direction of the camera faces the inside of the vehicle.

The controller, when the photographing direction of the camera faces the outside of the vehicle, may authenticate the driver based on the image obtained from the camera, and unlock the door based on the authentication result of the driver.

The controller, when the photographing direction of the camera faces the inside of the vehicle, may authenticate the driver based on the image obtained from the camera and determine whether to allow the vehicle to start based on the authentication result of the driver.

The controller, when the photographing direction of the camera faces the inside of the vehicle, may determine the state of the driver based on the image obtained from the camera.

The sensor portion may include at least one of a seating sensor for obtaining seating information related to the driver, a door locking device detecting a locked state of the door, or a door opening/closing sensor configured for detecting opening and closing of the door.

The camera may be provided on the inside of the vehicle, on an A-Pillar above a dashboard of the vehicle.

The controller may be configured to control the moving portion so that the photographing direction of the camera faces the driver's seat or the outside of the driver's seat side door.

According to various exemplary embodiments of the present invention, a controlling method of the vehicle including a camera and a moving portion connected to the camera and configured to adjust a photographing direction of the camera may include obtaining location information related to a driver; and controlling the moving portion so that the photographing direction of the camera faces the outside or the inside of the vehicle according to the location information related to the driver.

The controlling the moving portion so that the photographing direction of the camera faces the outside or the inside of the vehicle according to the location information related to the driver may include controlling the moving portion so that the photographing direction of the camera faces the outside of the vehicle when the driver is located outside the vehicle.

The controlling the moving portion so that the photographing direction of the camera faces the outside or the inside of the vehicle according to the location information related to the driver may include controlling the moving portion so that the photographing direction of the camera faces the inside of the vehicle when the door is unlocked and the door is opened even if the driver is located outside the vehicle.

The controlling the moving portion so that the photographing direction of the camera faces the outside or the inside of the vehicle according to the location information related to the driver includes controlling the moving portion so that a photographing direction of the camera faces the outside of the vehicle when a preset time elapses after the door is opened and the driver is located outside the vehicle.

The controlling the moving portion so that the photographing direction of the camera faces the outside or the inside of the vehicle according to the location information related to the driver includes controlling the moving portion so that the photographing direction of the camera faces the inside of the vehicle when the driver is located inside the vehicle.

The controlling the moving portion so that the photographing direction of the camera faces the outside or the inside of the vehicle according to the location information related to the driver includes controlling the moving portion so that the photographing direction of the camera faces the outside of the vehicle when the door is unlocked and the door is opened even if the driver is located inside the vehicle.

The controlling the moving portion so that the photographing direction of the camera faces the outside or the inside of the vehicle according to the location information related to the driver includes controlling the moving portion so that a photographing direction of the camera faces the inside of the vehicle when a preset time elapses after the door is opened and the driver is located inside the vehicle.

According to the vehicle and controlling method of the vehicle according to an aspect, it is possible to reduce vehicle cost, by use of a single camera to perform a plurality of functions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
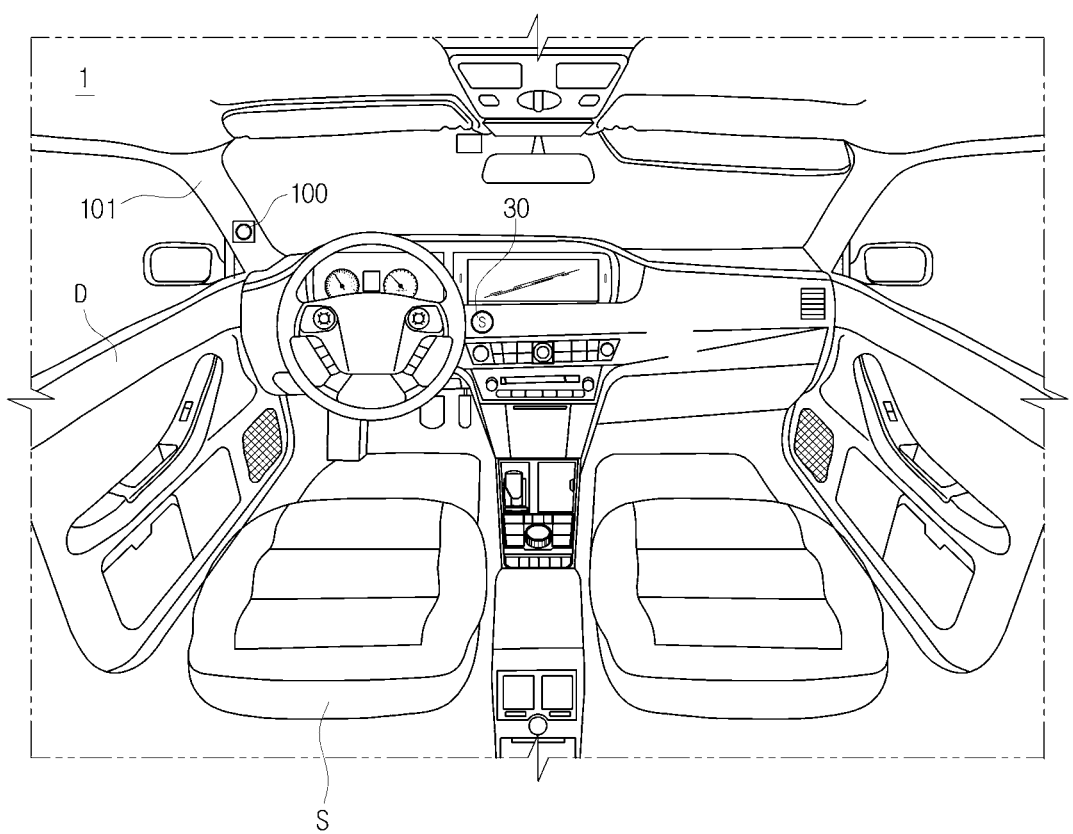
FIG. 1 is a control block diagram of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in portion by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments, it will be understood that the present description is not intended to limit the present invention(s) to those exemplary embodiments. On the other hand, the present invention(s) is/are intended to cover not only the exemplary embodiments, but also various alternatives, modifications, equivalents and other embodiments, which may be included within the spirit and scope of the present invention as defined by the appended claims.

Like numerals refer to like elements throughout the specification. Not all elements of embodiments of the present invention will be described, and description of what are commonly known in the art or what overlap each other in the exemplary embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in the present specification, specify the presence of stated features, integers, steps, operations, elements, and/or components, but do not preclude the presence or addition of one or more other features, integers, steps, operations, elements.

As used herein, the singular forms "a," "an" and "the" are intended to include the plural forms as well, unless the context clearly indicates otherwise.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

Reference numerals used for method steps are just used for convenience of explanation, but not to limit an order of the steps. Thus, unless the context clearly dictates otherwise, the written order may be practiced otherwise.

Hereinafter, a vehicle and a controlling method of the same according to eh invention will be described with reference to the accompanying drawings.

FIG. 1 is a view exemplarily illustrating an inside configuration of a vehicle 100 according to various exemplary embodiments of the present invention.

Each component shown in FIG. 1 refers to a software element and/or a hardware component, such as Field Programmable Gate Array (FPGA) and Application Specific Integrated Circuit (ASIC). FIG. 1 is a control block diagram of a vehicle according to an exemplary embodiment and FIG. 2 is a control block diagram of a vehicle according to an exemplary embodiment.

Figure 2:
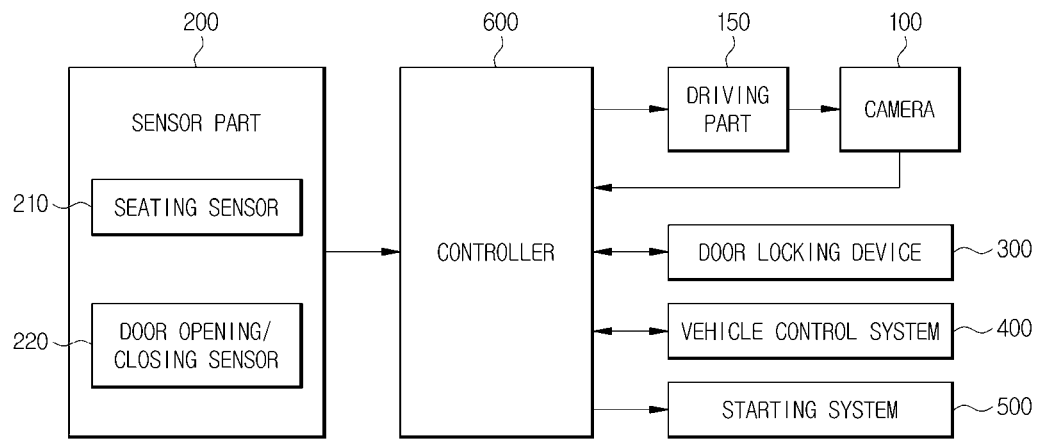
FIG. 2 is a control block diagram of a vehicle according to an exemplary embodiment.

FIG. 1 is a control block diagram of a vehicle according to an exemplary embodiment and FIG. 2 is a control block diagram of a vehicle according to an exemplary embodiment.

Referring to FIG. 1 and FIG. 2, a vehicle 1 according to an exemplary embodiment of the present invention may include a door D, a camera 100 for obtaining an image with an external view of the vehicle 1 or an internal view of the vehicle 1, and a seat S for a passenger to sit, and a start button 30 for turning on the ignition of the vehicle 1 may be included.

Furthermore, the vehicle 1 according to an exemplary embodiment a sensor portion 200 configured to obtain the location information related to the driver, a driving portion 150, which can also be called "a moving portion 150", configured to adjust the photographing direction of the camera 100, a door locking device 300 configured to lock or unlock the door D, a vehicle control system 400 configured to control the behavior of the vehicle 1 based on information collected from various vehicle sensors (for example, radar, LiDAR, camera), a starting system 500 configured to manage the starting of the vehicle 1 and a controller 600 configured to control various components of the vehicle 1.

The door D may shield the inside of the vehicle 1 from the outside thereof or communicate with the outside. A plurality of doors D for this may be provided in the vehicle 1.

Hereinafter, for convenience of explanation, the door D on the driver's seat side will be referred to as an example, but the description of the driver's seat door D may be applied to the passenger seat door D.

Based on the front of the vehicle 1, when the door D is closed, the left side of the door D may be classified as the exterior of the vehicle 1, and the right side of the door D may be classified as the inside of the vehicle 1.

The door D may be locked or unlocked through the door locking device 300.

The controller 600 may lock the door D or unlock the door D by outputting a signal for unlocking the door D or outputting a signal for locking the door D and transmitting it to the door locking device 300.

Furthermore, the controller 600 may receive information on the locked state of the door D from the door locking device 300.

The door opening/closing sensor 220 included in the sensor portion 200 may refer to all sensors configured for detecting the opening and closing of the door D.

For example, the door opening/closing sensor 220 may detect the opening of the door D when the door D is opened, and may detect the closing of the door D when the door D is closed.

The door opening/closing sensor 220 may transmit information on the open/close state of the door D to the controller 600.

A plurality of seats S, such as a driver's seat and a passenger seat next to the driver's seat, may be provided inside the vehicle 1.

Hereinafter, for convenience of description, the driver's seat S is referred to as an example, but the description of the driver's seat S may be applied to the passenger seat.

A seating sensor 210 for obtaining seating information related to a driver may be provided in the driver's seat S.

The seating sensor 210 may mean any sensor configured for detecting a state in which the driver is sitting in the driver's seat S. As an example, the seating sensor 210 may include a pressure sensor provided in the driver's seat S, but is not limited thereto.

Although shown separately in the drawing, the sensor portion 200 may include a door locking device 300. In the instant case, the door locking device 300 may detect the locked state of the door D and transmit information on the locked state to the controller 600.

The camera 100 may mean any component configured for obtaining a driver's facial image. For example, the camera 100 may employ a CMOS image sensor or a CCD image sensor.

The camera 100 may be provided on an A-Pillar 101 on the driver's seat S side, and preferably may be provided inside the vehicle 1. In the instant case, the camera 100 is preferably provided at the top portion of the dashboard to photograph both a user outside the vehicle 1 and a user inside the vehicle 1.

The image obtained from the camera 100 may be transmitted to the controller 600, and the controller 600 may perform various functions based on the image transmitted from the camera 100.

The driving portion 150 may adjust the photographing direction of the camera 100. For example, the driving portion 150 may include a motor M configured to generate power for rotating the camera 100 or moving the lens 110 of the camera 100; and a driving circuit configured to supply driving power to the motor M according to a control signal from the controller 600.

The motor M may receive driving power from a driving circuit and convert the supplied driving power into rotational force. Furthermore, as the camera 100 is rotated by the converted rotational force, the photographing direction of the camera 100 may be changed.

For example, the rotational force generated by the motor M may be transmitted to the camera 100 through a gear or the like. In other words, the motor M may rotate the camera 100 or move the lens 110 of the camera 100 through a gear or the like.

As an exemplary embodiment of the present invention, the rotational force generated by the motor M may be transmitted to the camera 100 through a fluid and a piston. In other words, the motor M may rotate the camera 100 or move the lens 110 of the camera 100 through a piston or the like.

The driving circuit may supply driving power for rotating the camera 100 to the motor M or supply driving power for moving the lens 110 of the camera 100 according to a control signal from the controller 600.

The driving circuit may include a switching element such as a relay for supplying driving power to the motor M or blocking driving power, or an inverter circuit.

Figure 3:
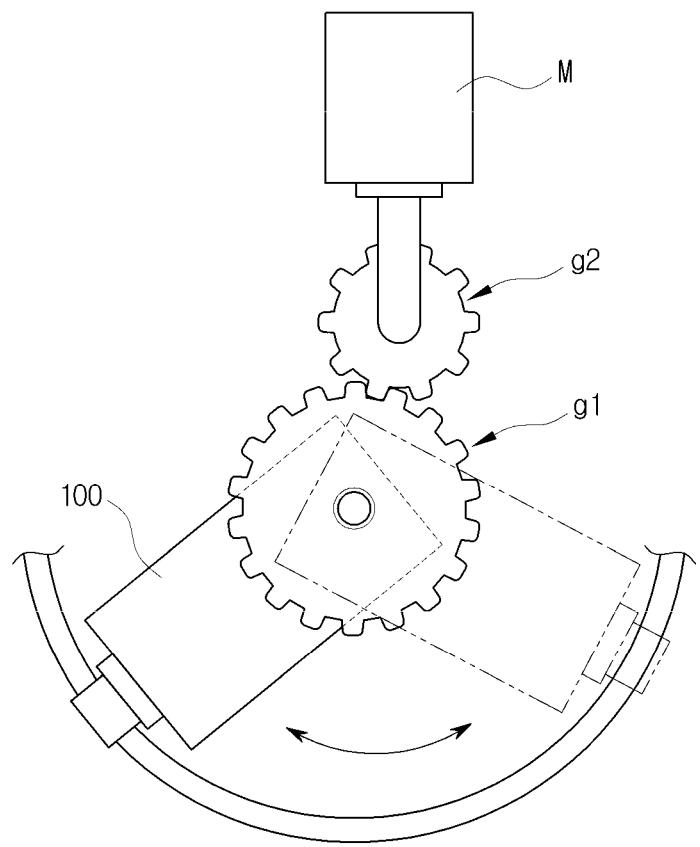
FIG. 3 is a diagram illustrating a structure for rotating a camera according to an exemplary embodiment.
Figure 4:
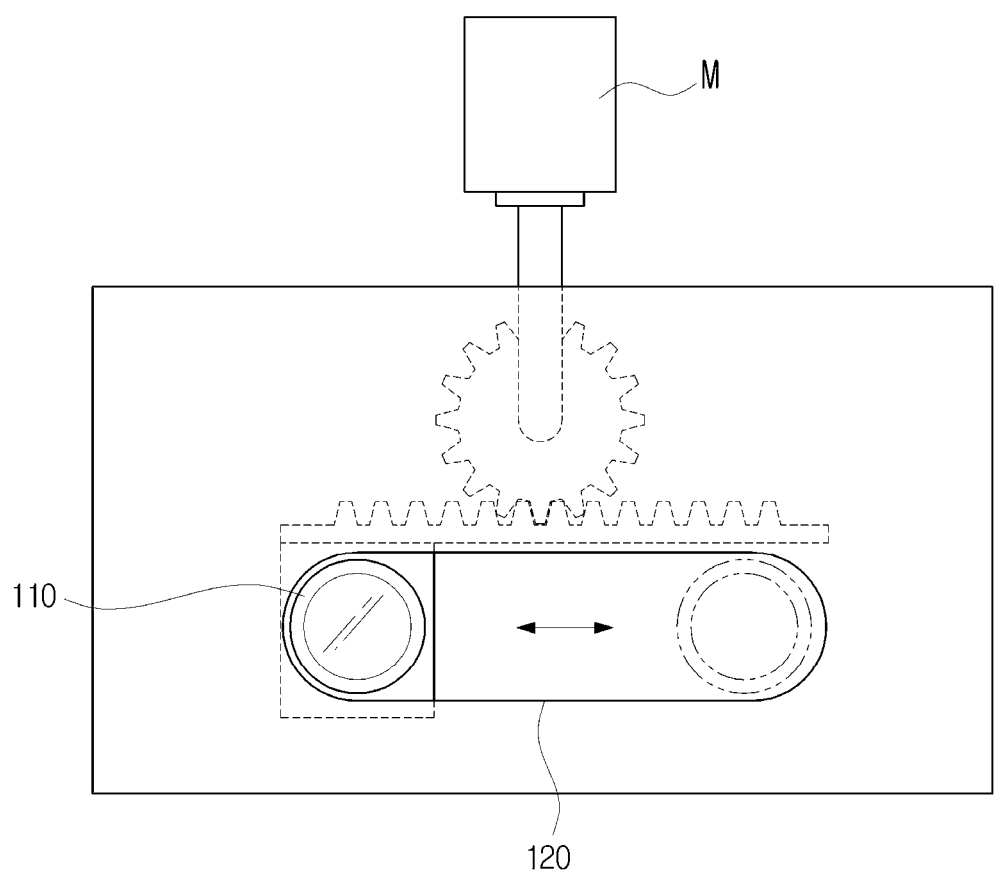
FIG. 4 is a diagram illustrating a structure for moving a lens of a camera according to an exemplary embodiment.

FIG. 3 is a diagram illustrating a structure for rotating a camera according to an exemplary embodiment and FIG. 4 is a diagram illustrating a structure for moving a lens of a camera according to an exemplary embodiment.

Referring to FIG. 3, the driving portion 150 may include a motor M that rotates the second gear g2 in contact with the first gear g1 connected to the camera 100. The first gear g1 may be connected to the camera 100 by being connected to the housing of the camera 100, and the photographing direction of the camera 100 may be changed according to the rotation of the first gear g1. The first gear g1 may be rotated according to the rotation of the second gear g2, and the second gear g2 may be rotated based on a rotational force provided by the motor M.

In the present way, the driving circuit of the driving portion 150 may adjust the photographing direction of the camera 100 by applying driving power to the motor M based on the control signal transmitted from the controller 600.

Referring to FIG. 4, the camera 100 may include a lens 110 and a guide 120 through which the lens 110 may move. The lens 110 may be configured to move in the axial direction within the guide 120.

In the instant case, the driving portion 150 may include a motor M that moves the lens 110 on the guide 120. For this, the driving portion 150 or the guide 120 may include a structure configured for changing the rotational force generated from the motor M into linear movement.

In the present way, the driving circuit of the driving portion 150 may change the position of the lens 110 to adjust the acquiring direction of the camera 100, by applying driving power to the motor M based on the control signal transmitted from the controller 600.

Referring back to FIGS. 1 to 2, the vehicle control system 400 may include various systems configured for controlling the behavior of the vehicle 1 according to a control signal from the controller 600.

For example, the vehicle control system 400 may control the speed of the vehicle 1 including a braking system and an acceleration system, and may control the steering of the vehicle 1 including a steering system.

As an exemplary embodiment of the present invention, the vehicle control system 400 may include a body control module configured for controlling an air conditioning device, a turn signal, and a window of the vehicle 1.

The controller 600 may determine the driver's state based on the facial image of the driver obtained from the camera 100 and control the vehicle control system 400 according to the driver's state.

For example, when it is determined that the driver is in a drowsy state, the controller 600 may control the vehicle control system 400 to set the vehicle 1 on the shoulder. Furthermore, when it is determined that the driver is in a drowsy state, the controller 600 may control the vehicle control system 400 to turn on the air conditioning apparatus of the vehicle 1 and open a window of the vehicle 1.

The starting system 500 may manage starting of the vehicle 1. For example, when the start button 30 is pushed by the user, the start of the vehicle 1 may be changed to an on state.

Also, the starting system 500 may determine whether to allow starting of the vehicle 1 based on a control signal from the controller 600. For example, when the vehicle 1 is not allowed to start, the starting system 500 may not turn on the vehicle 1 even if the starting button 30 is pushed.

The controller 600 may include at least one memory configured to store programs for performing the operations described above and operations to be described later, and at least one processor configured to execute the stored program.

When the controller 600 includes a plurality of memories and a plurality of processors, the plurality of memories and a plurality of processors may be integrated into one chip or may be physically separated. Furthermore, the controller 600 may include an image processor configured to process an image obtained from the camera 100.

For example, the controller 600 may adjust the photographing direction of the camera 100 by controlling the driving portion 150 based on the driver's location information obtained from the sensor portion 200, control the door locking device 300 by performing an authentication process of the driver based on the image obtained from the camera 100, control the starting system 500 by performing an authentication process of the driver based on the image obtained from the camera 100, and control the vehicle control system 400 by determining a driver's state based on an image obtained from the camera 100.

In the above, various components of the vehicle 1 according to an exemplary embodiment have been described with reference to FIG. 1, FIG. 2, FIG. 3, and FIG. 4, but the components of the vehicle 1 are not limited to the above description, and specific components may be changed or added within the usual range.

Information or signals obtained from the sensor portion 200, the camera 100, the door locking device 300, the vehicle control system 400, and the starting system 500 according to an exemplary embodiment of the present invention may be transmitted to the controllers 600 and 400.

In the instant case, a signal may be transmitted by use of a controller area network (CAN) communication method.

That is, to control various electric loads mounted on the vehicle 1 and communicate between various electric loads, a communication network including a body network, a multimedia network, a chassis network, and the like is configured in the vehicle 1, and each of the networks separated from each other may be connected by the controller 600 to exchange controller area network (CAN) communication messages with each other.

Hereinafter, a method of controlling the vehicle 1 using components of the vehicle 1 according to an exemplary embodiment will be described with reference to FIG. 5, FIG. 6 and FIG. 7.

Figure 5:
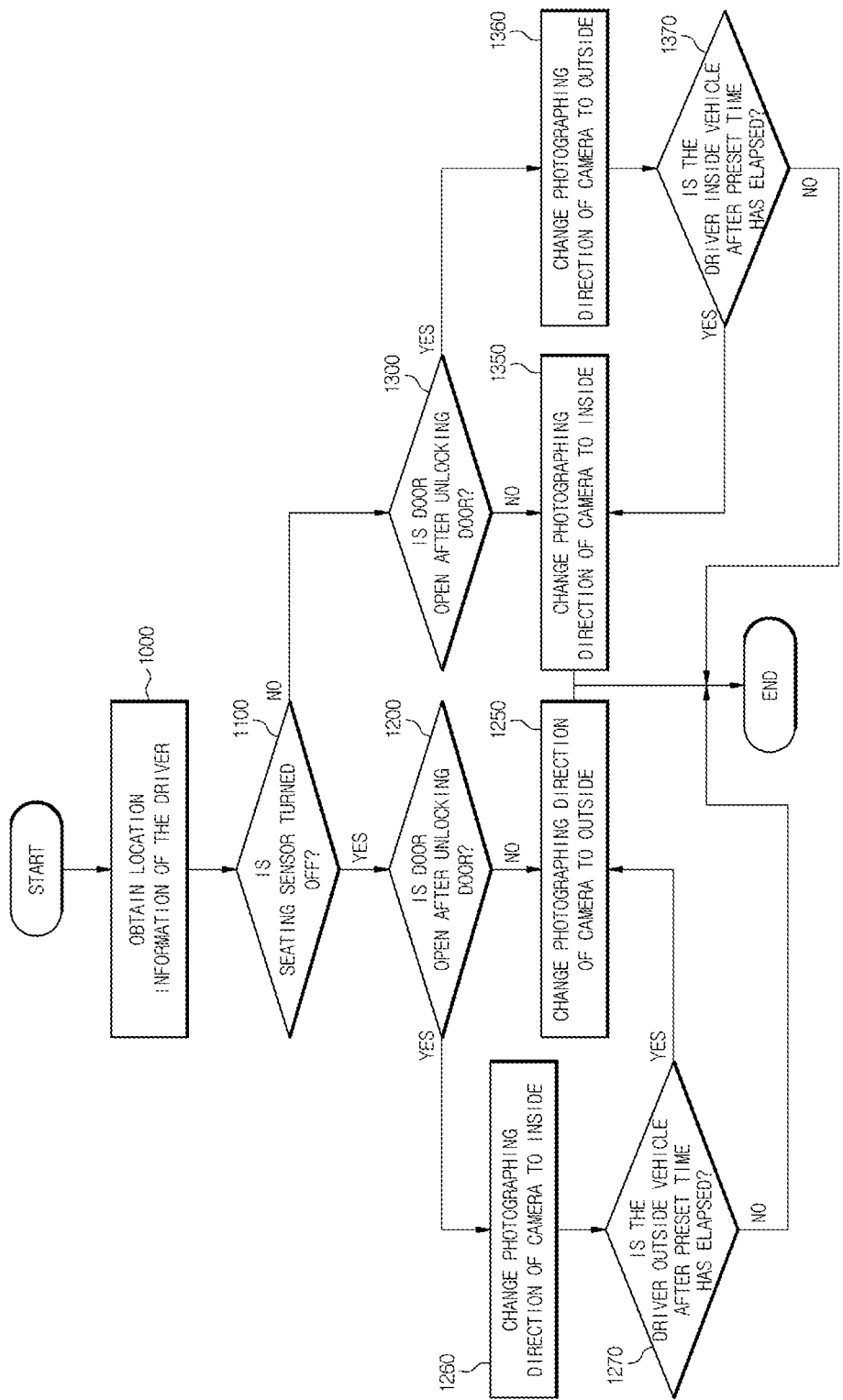
FIG. 5 is a flowchart of a method for controlling a vehicle according to an exemplary embodiment.
Figure 6:
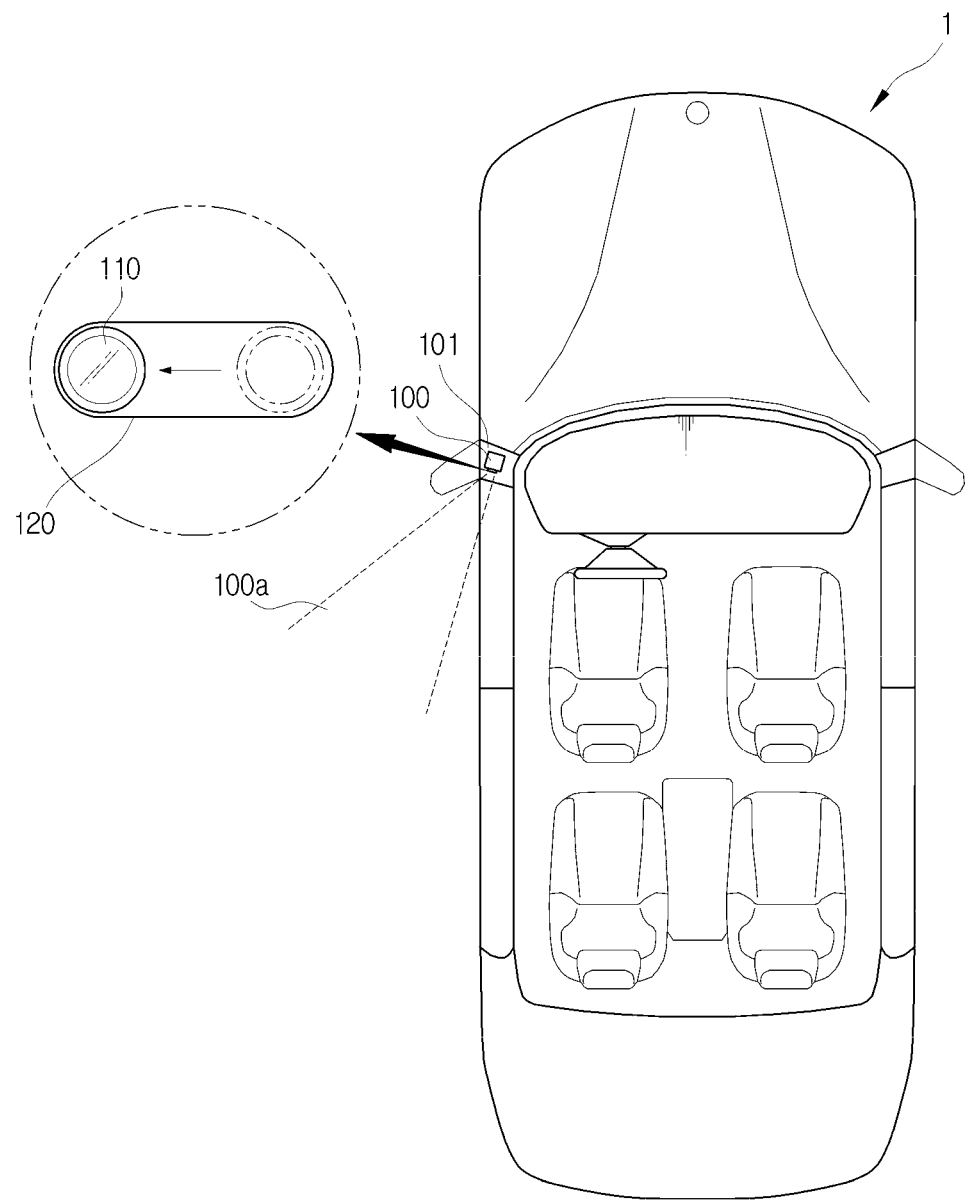
FIG. 6 is a diagram illustrating a situation in which the driver is located outside the vehicle.
Figure 7:
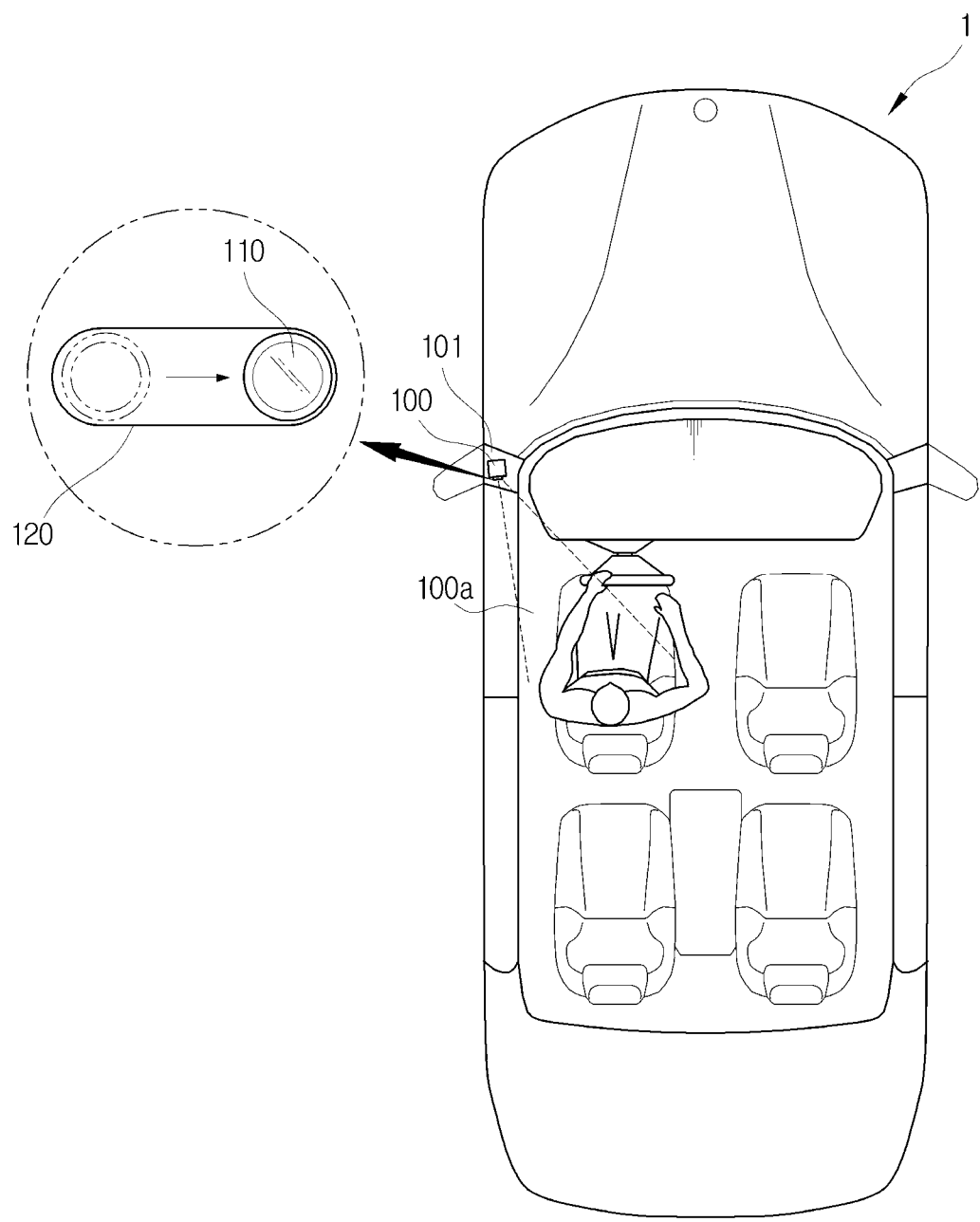
FIG. 7 is a diagram illustrating a situation in which a driver is located inside a vehicle.

FIG. 5 is a flowchart of a method for controlling a vehicle according to various exemplary embodiments of the present invention, FIG. 6 is a diagram illustrating a situation in which the driver is located outside the vehicle, and FIG. 7 is a diagram illustrating a situation in which a driver is located inside a vehicle.

Referring to FIG. 5, the sensor portion 200 may obtain location information related to a driver and transmit the obtained location information to the controller 600 (1000).

The seating sensor 210 may obtain the seating information related to the driver, and the seating sensor 210 may transmit information that the driver is located outside the vehicle 1 to the controller 600 when the driver is not sitting in the driver's seat S (the seating sensor is OFF).

Furthermore, the seating sensor 210 may transmit information that the driver is located inside the vehicle 1 to the controller 600 when the driver is sitting in the driver's seat S (the seating sensor is ON).

The door opening/closing sensor 220 may obtain open/close information related to the door D, and the open/close information related to the door D may be used to predict a driver's position.

For example, when the driver is not sitting in the driver's seat S, since it is reasonably assumed that the driver will sit in the driver's seat S if the door D is opened after the door D is unlocked, the driver may be considered to be located inside the vehicle 1 even when the seating sensor 210 is in the OFF state.

Conversely, when the driver is sitting in the driver's seat S, since it is reasonably assumed that the driver will go outside the vehicle 1 if the door D is opened after the door D is unlocked, the driver may be considered to be located outside the vehicle 1 even when the seating sensor 210 is in the ON state.

The controller 600 may control a photographing direction of the camera 100 based on the driver's location information obtained from the sensor portion 200.

Even when the seating sensor 210 is in the ON state, the driver may be considered to be located outside the vehicle 1.

For example, the controller 600, when the driver is located outside the vehicle 1, that is, when the seating sensor 210 is in the OFF state (example of 1100), may control the driving portion 150 so that the photographing direction of the camera 100 faces the outside of the vehicle 1 (1250).

The controller 600 may change the photographing direction of the camera 100 to face the outside by controlling the driving portion 150 at the time when the seating sensor 210 is changed from the ON state to the OFF state, but the operation timing of the driving portion 150 is not limited thereto, and when the seating sensor 210 is in the OFF state, the driving portion 150 may be operated without limitation.

Referring to FIG. 6, the controller 600 may transmit a control signal to the driving circuit of the driving portion 150, and the driving circuit of the driving portion 150 may change the photographing direction of the camera 100 to face the outside by applying driving power to the motor M in a response to the control signal.

For example, the motor M may rotate the second gear g2 in contact with the first gear g1 connected to the camera 100 by use of the driving power, and the photographing direction of the camera 100 may be adjusted to face the outside of the vehicle 1 as the first gear g1 rotates counterclockwise in a response to the rotation of the second gear g2.

As an exemplary embodiment of the present invention, the motor M may move the lens 110 on the guide 120 to the left by use of the driving power, and the photographing direction of the camera 100 may be adjusted to the outside of the vehicle 1 in a response to the movement of the lens 110.

In the instant case, the photographing direction of the camera 100 may be toward the outside of the driver's seat S side door D, and the camera 100 may include a photographing area 100*a* passing through the window of the driver's seat S side door D. That is, the controller 600 may control the driving portion 150 so that the photographing direction of the camera 100 faces the outside of the driver's seat S side door D.

Even if the driver is located outside the vehicle 1, that is, even if the seating sensor 210 is in the OFF state (example of 1100), when the door D is unlocked and the door D is opened (example of 1200), the controller 600 may control the driving portion 150 so that the photographing direction of the camera 100 faces the inside of the vehicle 1 (1260).

At the present time, the controller 600 may receive information on the locked state of the door D from the door locking device 300, and receive information on the opening of the door D from the door opening/closing sensor 220. That is, when the door opening/closing sensor 220 detects the opening of the door D after the door locking device 300 outputs the unlocking signal of the door D while the seating sensor 210 is OFF, the controller 600 may control the driving portion 150 so that the photographing direction of the camera 100 faces the inside of the vehicle 1.

As described above, it is reasonably assumed that when the driver is located outside the vehicle 1 and the door D is opened after the door D is unlocked, the driver will sit in the driver's seat S.

However, when it is determined that the driver is located outside the vehicle 1 even after the preset time elapses after the door D is opened and the preset time elapses (example of 1270), the controller 600 may control the driving portion 150 so that the photographing direction of the camera 100 faces the outside of the vehicle 1 (1250).

In the above case, this is because the driver unlocks the door D and opens the door D, but has not boarded the driver's seat S.

When the driver is located inside the vehicle 1 (No in 1270) after a preset time has elapsed after the door D is opened, the camera 100 may photograph the driver inside the vehicle 1 as the photographing direction of the camera 100 is maintained inside the vehicle 1.

When the driver is located inside the vehicle 1, that is, when the seating sensor 210 is in the ON state (No in 1100), the controller 600 may control the driving portion 150 so that the photographing direction of the camera 100 faces the inside of the vehicle 1 (1350).

The controller 600 may change the photographing direction of the camera 100 to face the inside by controlling the driving portion 150 at the time when the seating sensor 210 is changed from the OFF state to the ON state, but the operation timing of the driving portion 150 is not limited thereto, and when the seating sensor 210 is in the ON state, the driving portion 150 may be operated without limitation.

Referring to FIG. 7, the controller 600 may transmit a control signal to the driving circuit of the driving portion 150, and the driving circuit of the driving portion 150 may change the photographing direction of the camera 100 to face the inside by applying driving power to the motor M in a response to the control signal.

For example, the motor M may rotate the second gear g2 in contact with the first gear g1 connected to the camera 100 by use of driving power, the photographing direction of the camera 100 may be adjusted to the inside of the vehicle 1 as the first gear g1 rotates clockwise in a response to the rotation of the second gear g2.

As an exemplary embodiment of the present invention, the motor M may move the lens 110 on the guide 120 to the right by use of driving power, and the photographing direction of the camera 100 may be adjusted to the inside of the vehicle 1 in a response to the movement of the lens 110.

In the instant case, the photographing direction of the camera 100 may be toward the driver's seat S, and the camera 100 may have a photographing area 100*a* including a driver sitting in the driver's seat S. That is, the controller 600 may control the driving portion 150 so that the photographing direction of the camera 100 faces the driver's seat S.

Even if the driver is located inside the vehicle 1, that is, even if the seating sensor 210 is in the ON state (No in 1100), when the door D is unlocked and the door D is opened (Yes in 1300), the controller 600 may control the driving portion 150 so that the photographing direction of the camera 100 faces the outside of the vehicle 1 (1360).

At the present time, the controller 600 may receive information on the locked state of the door D from the door locking device 300, and receive information on the opening of the door D from the door opening sensor 220.

When the door D is opened from the door opening/closing sensor 220 after the door lock release signal is output from the door locking device 300 while the seating sensor 210 is ON, the controller 600 may control the driving portion 150 so that the photographing direction of the camera 100 faces the outside of the vehicle 1.

As described above, it is reasonably assumed that when the driver is located inside the vehicle 1 and the door D is opened after the door D is unlocked, the driver will sit in the driver's seat S.

However, when it is determined that a preset time elapses after the door D is opened, and the driver is located inside the vehicle 1 even after the preset time elapses (example of 1370), the controller 600 may control the driving portion 150 so that the photographing direction of the camera 100 faces the inside of the vehicle 1 (1350).

In the above case, this is because the driver unlocks the door D and opens the door D, but does not go out of the vehicle 1.

When the driver is located outside the vehicle 1 after the preset time has elapsed after the door D is opened (No in 1370), the camera 100 may photograph a driver outside the vehicle 1 as Since the photographing direction of the camera 100 is maintained outside the vehicle 1.

Although not shown in FIG. 5, when the photographing direction of the camera 100 faces the outside of the vehicle 1, the controller 600 may unlock the door D by authenticating the driver based on the image obtained from the camera 100 and controlling the door locking device 300 based on the authentication result of the driver.

That is, in the case of the camera 100 facing the outside of the vehicle 1, it may be used for unlocking the door D by authenticating the driver's face.

Furthermore, when the photographing direction of the camera 100 faces the inside of the vehicle 1, the controller 600 may determine whether to allow starting of the vehicle 1 by authenticating the driver based on the image obtained from the camera 100 and controlling the starting system 500 based on the authentication result of the driver.

That is, in the case of the camera 100 facing the inside of the vehicle 1, it may be used for determining whether to allow the start-up by authenticating the driver's face.

Furthermore, when the photographing direction of the camera 100 is toward the inside of the vehicle 1, the controller 600 may determine the driver's state based on the image obtained from the camera 100 and control the vehicle 1 system according to the driver's state.

That is, in the case of the camera 100 facing the inside of the vehicle 1, it may be used to assist the driver by determining the driver's state.

Examples of the vehicle and the vehicle control method are not limited thereto, and the exemplary embodiments described above are illustrative in all respects.

Therefore, those of ordinary skill in the art to which an exemplary embodiment of the present invention pertains will be able to understand that the present invention may be implemented in other specific forms without changing the technical spirit or essential features.

The scope of the present invention is shown in the claims rather than the foregoing description, and all differences within the scope equivalent thereto may be construed as being included in an exemplary embodiment of the present invention.

According to various exemplary embodiments of the present invention, the use of the camera may be maximized by changing the photographing direction of a single camera based on the location information related to the driver. Accordingly, an increase in cost due to an increase in the number of cameras may be prevented Meanwhile, the disclosed exemplary embodiments may be embodied in a form of a recording medium storing instructions executable by a computer. The instructions may be stored in a form of program code, and when executed by a processor, may generate a program module to perform the operations of the included exemplary embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a camera;
   at least one sensor configured to obtain location information related to a driver;
   an actuator connected to the camera and configured to adjust a photographing direction of the camera; and
   a controller connected to the at least one sensor and the actuator and configured to control the actuator so that the photographing direction of the camera faces the outside of the vehicle or the inside of the vehicle according to the location information related to the driver,
   wherein the controller is configured to:
      control the actuator so that the photographing direction of the camera faces the outside of the vehicle when the driver is located outside the vehicle, and
      control the actuator so that the photographing direction of the camera faces the inside of the vehicle even if the driver is located outside the vehicle, when a door of the vehicle is unlocked and the door is opened.

2. The vehicle of claim 1 wherein the controller is configured to control the actuator so that the photographing direction of the camera faces the inside of the vehicle when a preset time elapses after the door is opened and the driver is located outside the vehicle.

3. The vehicle of claim 1, wherein the controller is configured to control the actuator so that the photographing direction of the camera faces the inside of the vehicle when the driver is located inside the vehicle.

4. The vehicle of claim 3, wherein the controller is configured to control the actuator so that the photographing direction of the camera faces the outside of the vehicle when the door is unlocked and the door is opened.

5. The vehicle of claim 4, wherein the controller is configured to control the actuator so that the photographing direction of the camera faces the inside of the vehicle when a preset time elapses after the door is opened and the driver is located inside the vehicle.

6. The vehicle of claim 1, wherein the controller is configured to authenticate the driver based on an image obtained from the camera, and to unlock the door according to a result of authenticating the driver when the photographing direction of the camera faces the outside of the vehicle.

7. The vehicle of claim 1, wherein the controller is configured to authenticate the driver according to an image obtained from the camera, and to determine whether to allow the vehicle to start according to a result of authenticating the driver when the photographing direction of the camera faces the inside of the vehicle.

8. The vehicle of claim 1, wherein the controller is configured to determine a state of the driver according to an image obtained from the camera when the photographing direction of the camera faces the inside of the vehicle.

9. The vehicle of claim 1, wherein the at least one sensor includes at least one of a seating sensor for obtaining seating information related to the driver, a door locking device configured for detecting a locked state of the door and a door opening/closing sensor configured for detecting opening and closing of the door.

10. The vehicle of claim 1, wherein the camera is disposed on the inside of the vehicle and on an A-Pillar above a dashboard of the vehicle.

11. The vehicle of claim 10, wherein the controller is configured to control the actuator so that the photographing direction of the camera faces the driver's seat or the outside of the driver's seat side door.

12. A controlling method of a vehicle including a camera and an actuator connected to the camera and configured to adjust a photographing direction of the camera, the controlling method comprising:
   obtaining, by a controller connected to the actuator, location information related to a driver; and
   controlling, by the controller, the actuator so that the photographing direction of the camera faces the outside or the inside of the vehicle according to the location information related to the driver,
   wherein the controlling the actuator so that the photographing direction of the camera faces the outside or the inside of the vehicle according to the location information related to the driver includes:
      controlling the actuator so that the photographing direction of the camera faces the inside of the vehicle when the driver is located inside the vehicle; and
      controlling the actuator so that the photographing direction of the camera faces the outside of the vehicle when a door is unlocked and the door is opened even if the driver is located inside the vehicle.

13. The controlling method of claim 12, wherein the controlling the actuator so that the photographing direction of the camera faces the outside or the inside of the vehicle according to the location information related to the driver includes:
   controlling the actuator so that the photographing direction of the camera faces the outside of the vehicle, when the driver is located outside the vehicle.

14. The controlling method of claim 13, wherein the controlling the actuator so that the photographing direction of the camera faces the outside or the inside of the vehicle according to the location information related to the driver includes:
   controlling the actuator so that the photographing direction of the camera faces the inside of the vehicle when the door of the vehicle is unlocked and the door is opened even if the driver is located outside the vehicle.

15. The controlling method of claim 14, wherein the controlling the actuator so that the photographing direction of the camera faces the outside or the inside of the vehicle according to the location information related to the driver includes:
   controlling the actuator so that the photographing direction of the camera faces the outside of the vehicle when a preset time elapses after the door is opened and the driver is located outside the vehicle.

16. The controlling method of claim 12, wherein the controlling the actuator so that the photographing direction of the camera faces the outside or the inside of the vehicle according to the location information related to the driver includes:
   controlling the actuator so that the photographing direction of the camera faces the inside of the vehicle when a preset time elapses after the door is opened and the driver is located inside the vehicle.

* * * * *